United States Patent
Orr et al.

(10) Patent No.: US 8,873,428 B1
(45) Date of Patent: Oct. 28, 2014

(54) PEER-TO-PEER BASED GROUP CONFIGURATION FOR INTERCONNECTED DEVICES

(75) Inventors: Michael Orr, Sunnyvale, CA (US); Nafea Bshara, San Jose, CA (US)

(73) Assignee: Marvell International Ltd., Hamilton (BM)

(*) Notice: Subject to any disclaimer, the term of this patent is extended or adjusted under 35 U.S.C. 154(b) by 132 days.

(21) Appl. No.: 13/528,436

(22) Filed: Jun. 20, 2012

Related U.S. Application Data (60) Provisional application No. 61/502,674, filed on Jun. 29, 2011.

(51) Int. Cl.
*H04L 12/28* (2006.01)
(52) U.S. Cl.
USPC .......................................... 370/254; 370/400
(58) Field of Classification Search
USPC ................... 370/254–258, 400–408
See application file for complete search history.

(56) References Cited

U.S. PATENT DOCUMENTS

| | | | | |
|---|---|---|---|---|
| 6,088,333 A | * | 7/2000 | Yang et al. | 370/238 |
| 6,147,992 A | * | 11/2000 | Giroir et al. | 370/390 |
| 6,208,623 B1 | * | 3/2001 | Rochberger et al. | 370/254 |
| 6,718,396 B1 | * | 4/2004 | Maejima et al. | 709/249 |
| 7,304,955 B2 | * | 12/2007 | Lee | 370/237 |
| 8,036,126 B2 | * | 10/2011 | Shaikh et al. | 370/235 |
| 2007/0053342 A1 | * | 3/2007 | Sierecki et al. | 370/351 |
| 2008/0089248 A1 | * | 4/2008 | Ushiyama et al. | 370/256 |
| 2010/0008368 A1 | * | 1/2010 | Karloff | 370/400 |
| 2012/0072574 A1 | * | 3/2012 | Wang et al. | 709/224 |

* cited by examiner

*Primary Examiner* — Thai Hoang (57) ABSTRACT

Embodiments provide a method for discovering, by a network device of a network, a plurality of network devices of the network; establishing, by the network device, a group of network devices, wherein the group of network devices comprises the network device and a subset of the plurality of network devices; receiving, by the network device, information that is pertinent to one or more network devices included in the group of network devices; processing the information to generate processed information; and propagating the processed information to one or more network devices of the subset of the plurality of network devices.

18 Claims, 3 Drawing Sheets

PEER-TO-PEER BASED GROUP CONFIGURATION FOR INTERCONNECTED DEVICES

CROSS-REFERENCES TO RELATED APPLICATIONS

The present disclosure claims priority to U.S. Provisional Patent Application No. 61/502,674 filed Jun. 29, 2011, the entire disclosure of which is hereby incorporated by reference in its entirety except for those sections, if any, that are inconsistent with this disclosure.

TECHNICAL FIELD

Embodiments of the present disclosure relate to the field of interconnected devices, and more particularly, to group configuration for interconnected devices.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In an example conventional network environment, a plurality of network devices (e.g., network switches, routers, servers, and/or the like) is connected to a network. An administrator can configure (e.g., update one or more configuration settings, provide updated driver or firmware, and/or the like) the plurality of network devices by, for example, individually accessing and configuring each of the plurality of network devices. Additionally or alternatively, the administrator can configure a central network management system (e.g., a server that can access the plurality of network devices), and the central network management system can individually access and configure each of the plurality of network devices. However, in a large network environment that includes a large number of network devices, individually accessing and configuring of the network devices can be time consuming and unreliable.

SUMMARY

In an embodiment, there is provided a network device included in a network, the network device comprising a device discovery module configured to discover a plurality of network devices of the network; a device grouping module configured to establish a group of network devices comprising the network device and a subset of the plurality of network devices; an information reception module configured to receive information that is pertinent to one or more network devices included in the group of network devices; an information processing module configured to process the information to generate processed information; and an information propagation module configured to propagate the processed information to one or more network devices of the subset of the plurality of network devices. The device grouping module is configured to establish the group of network devices based on the network device and the subset of the plurality of network devices having one or more common attributes. The one or more common attributes comprise one or more of a type of network device, a device class of network device, a make of network device, a model of network device, and a version number of network device. The information processing module is configured to process the information by modifying the information to generate the processed information.

In an embodiment, the information comprises a first subset of information and a second subset of information, wherein the information processing module is configured to process the information such that (i) the first subset of information is included in the processed information, and (ii) the second subset of information is excluded from the processed information. The information processing module is configured to process the information such that the information and the processed information are the same.

In an embodiment, the network device is a first network device, and the information propagation module is configured to propagate the processed information by transmitting the processed information to a second network device of the one or more network devices of the subset of the plurality of network devices in order to facilitate the second network device to propagate the processed information to another one or more network devices of the subset of the plurality of network devices; and the second network device is coupled to the first network device via a communication link.

In an embodiment, the information comprises one or more of (i) configuration information to configure the one or more network devices included in the group of network devices, (ii) updates to update software or firmware installed in the one or more network devices included in the group of network devices, (iii) programming scripts for execution by the one or more network devices included in the group of network devices, and (iv) attributes that identify individual network devices in the group of network devices, which are to receive a respective subset of the information. The information reception module is configured to receive the information from one or both of (i) an administrator of the network, and (ii) another one or more network devices of the subset of the plurality of network devices. In an embodiment, the network device further comprises a decryption module configured to decrypt the information received by the information reception module; and an encryption module configured to encrypt the processed information, prior to propagating the processed information.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION

Figure 1:
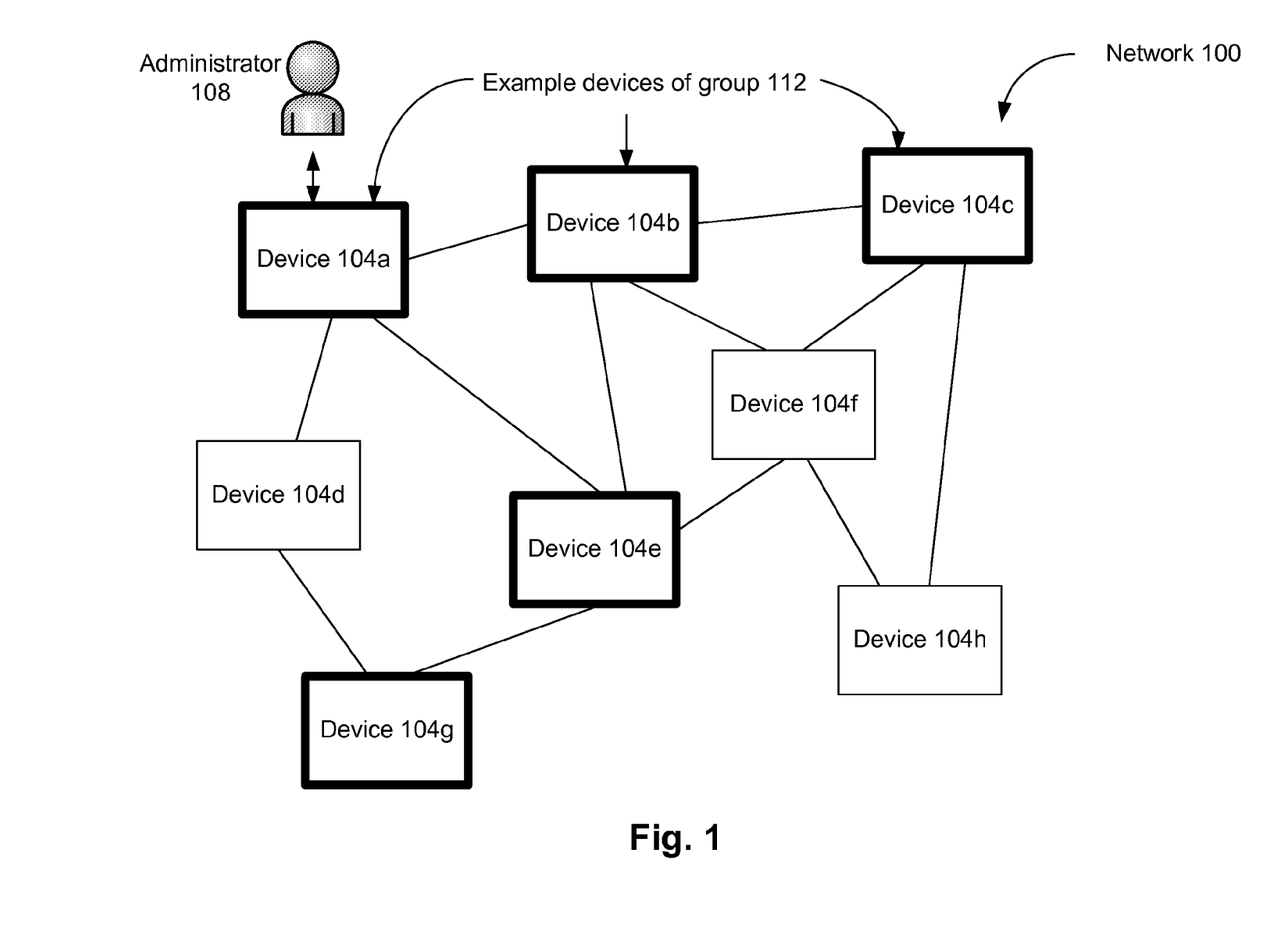
FIG. 1 schematically illustrates an example network comprising a plurality of network devices.

FIG. 1 schematically illustrates an example communication network 100 (henceforth referred to as "network 100"). The network 100 comprises a plurality of network devices (henceforth referred to as "devices") 104a, . . . , 104h interconnected using a plurality of communication links.

The devices 104a, . . . , 104h are, for example, one or more of network switches, network routers, servers, network gateways, and/or appropriate devices configured to be connected to a communication network. The devices 104a, . . . , 104h include devices of various makes, models, types, devices classes, etc. In an example, the devices 104*a* and 104*e* are both network routers manufactured by a specific manufacturer, and are of a same type and a same model. In an embodiment, each of the communication links of the network 100 is, for example, a wired communication link or a wireless communication link that uses an appropriate communication protocol.

As illustrated in FIG. 1, the device 104*a* is coupled to the devices 104*b*, 104*d* and 104*e* via respective communication links. The device 104*a* is also coupled to the device 104*f*, e.g., via the device 104*b* and also via the device 104*e*, as illustrated in FIG. 1. Thus, a device in the network 100 is either directly coupled to another device in the network 100 via a communication link, or indirectly coupled to the another device via one or more other devices and respective communication links. Although FIG. 1 illustrates a specific number of devices and a specific configuration of the network 100, such a number of the devices and such a configuration of the network 100 are merely examples, and do not limit the teachings of the present disclosure.

In an embodiment, a device (e.g., device 104*a*) of the devices 104*a*, . . . , 104*h* discovers other devices in the network 100. For example, the device 104*a* recursively discovers other devices in the network 100 using an appropriate communication protocol. For example, the device 104*a* discovers its neighboring devices 104*d*, 104*b* and 104*e* (i.e., devices with which the device 104*a* is directly coupled via a communication link). In an example, subsequent to the discovery of the device 104*b* by the device 104*a*, the device 104*b* provides the device 104*a* information about the neighboring devices of the device 104*b*. For example, device 104*b* provides information about devices 104*e*, 104*f* and 104*c* to the device 104*a*, thereby enabling the device 104*a* to discover the devices 104*f* and 104*c* (and rediscover the device 104*e*). Also, the device 104*f* discovers the devices 104*c*, 104*e* and 104*h*, and transmits information about these devices to the device 104*b*. The device 104*b* also transmits information about the device 104*h* to the device 104*a*. Accordingly, in an embodiment, in a recursive manner, the device 104*a* discovers all the other devices of the network 100.

In an embodiment, a device may partially or fully discover its neighboring devices. As an example, the device 104*e* may initially discover only some of the other devices of the network 100 (e.g., discover devices 104*b*, 104*a* and 104*f*, for example, using an appropriate discovery protocol). However, if necessary, the device 104*e* may re-run the discovery process and discover other devices of the network 100 that were previously undiscovered. As will be discussed in further detail below, an administrator of the network 100 may select, for example, the device 104*e* for propagating information (e.g., software updates, configuration information, etc.) to various other devices of the network 100. In such a scenario, the device 104*e* may inform the administrator (e.g., through a suitable graphic user interface (GUI) or any other appropriate manner) of various other devices that the device 104*a* has discovered so far. Furthermore, based on selecting the device 104*e* for propagation of information, the device 104*e* may re-run the discovery process (e.g., or run a more thorough discovery process) to fully discover various other devices of the network 100 (e.g., discover devices that were previously undiscovered by the device 104*e*). Subsequently, the device 104*e* may inform the administrator of the various devices that the device 104*a* has discovered.

In an embodiment, while a device discovers other devices in the network 100, the device collects, among other information, existence, routing information and device information of the other devices. For example, while the device 104*a* discovers the device 104*f*, the device 104*a* stores information about one or more routes to reach the device 104*f*. For example, the device 104*a* can reach the device 104*f* (i) via the device 104*b*, (ii) via the device 104*e*, (iii) via the devices 104*d*, 104*g*, and 104*e*, and/or the like. Furthermore, while the device 104*a* discovers the device 104*f*, the device 104*a* stores information about the device 104*f* (e.g., a make, a manufacturer, a model, a type, an identity, a configuration and/or like information associated with the device 104*f*). In an embodiment, if a device is selected by the administrator (or selected by another device) for propagating information (e.g., software updates, configuration information, etc.) to various other devices of the network, the selected device informs the administrator (e.g., via a GUI or any other appropriate manner) various information about the other devices that the selected device has discovered so far. For example, while the device 104*a* discovers the device 104*f*, the device 104*a* stores various information about the device 104*f*. If the device 104*a* is selected for propagating information to various other devices of the network, the device 104*a* informs the administrator the various information about the device 104*f* (e.g., a route to reach the device 104*f*, a make, a manufacturer, a model, a type, an identity, a configuration and/or like information associated with the device 104*f*).

A device discovers other devices of the network 100, for example, when the device is connected to the network 100, when the device starts up (or is reset), on a periodic basis (e.g., as the network 100 may change with time), and/or on a continuous basis.

In an embodiment, while or subsequent to discovering other devices of the network 100, a device establishes a logical group (henceforth referred to as "group") of devices comprising the device and one or more other devices of the network 100. Such a group is established based on, for example, one or more common attributes shared by the device and the one or more other devices of the network 100. The one or more common attributes include a type, a make, a model, a device class, configuration and/or other appropriate criteria associated with the devices of the network 100.

For example, the device 104*a* discovers devices 104*b*, . . . , 104*h* of the network 100. The device 104*a* determines, for example, that the device 104*a* and the devices 104*b*, 104*c*, 104*e* and 104*g* share one or more common attributes, based on which the device 104*a* forms a group 112 of devices comprising the devices 104*a*, 104*b*, 104*c*, 104*e* and 104*g* (devices included in the group 112 is illustrated in bold lines in FIG. 1). For example, the device 104*a* determines that the devices 104*a*, 104*b*, 104*c*, 104*e* and 104*g* are all network routers, are manufactured by the same manufacturer, are of same model, have same device class and/or have similar configurations, based on which the group 112 is formed. In an embodiment, the device 104*a* communicates with the devices 104*b*, 104*c*, 104*e* and 104*g*, prior to or while forming the group 112. In an embodiment, the group 112 is formed based on collective participation or collaboration between the devices included in the group 112. In an embodiment, the group 112 is updated adaptively (e.g., when a device of the group 112 leaves the network 100, and/or when a new device, sharing common attributes with the devices of the group 112, joins the network 100).

In an embodiment, individual devices of the group 112 are aware of existence and location of other devices in the group 112. For example, the device 102*e* is aware that devices 104*a*, 104*b*, 104*c* and 104*g* are also included in the group 112, and is also aware about various routes to reach each of these other devices of the group 112. In an embodiment, individual devices of the group 112 are aware of various attributes (e.g., device class, make, model, configuration, capacity, etc.) of other devices in the group 112.

The formation of the group 112 in FIG. 1 is merely an example. Although the group 112 is illustrated to include a specific number of devices, in another embodiment, the group 112 may include any other appropriate number of devices. Although the network 100 is illustrated to include only one group 112, in another embodiment, any other appropriate number of groups may be established in the network 100.

In an embodiment, discovering the devices and grouping the devices of the network 100 may be performed using an appropriate protocol, e.g., the Internet Group Management Protocol (IGMP), the Universal Plug and Play (UPnP) protocol, the Link Layer Discovery Protocol (LLDP), and/or the like (e.g., using an appropriate version of these example protocols).

In an embodiment, a device receives information from one or more appropriate sources. For example, the device 104a receives information from an administrator 108 of the network 100 (e.g., the administrator 108 manually enters the information in the device 104a, and/or transmits the information to the device 104a using, for example, a network management system or an appropriate computing device). Additionally or alternatively, the device 104a receives the information from one or more devices that belong to the group 112. In an example, a subset of the information is received from the administrator and another subset of the information is received from the one or more devices of the group 112.

The information received by the device 104a is pertinent to the device 104a and to one or more other devices of the group 112. In an embodiment, the information received by the device 104a includes configuration information that is used, for example, to configure the device 104a and/or one or more other devices of the group 112. Additionally or alternatively, in an embodiment, the information received by the device 104a includes software updates (and/or firmware updates) that are used to update the device 104a and/or one or more other devices of the group 112. Additionally or alternatively, in an embodiment, the information received by the device 104a includes one or more scripts or software instructions to be executed by the device 104a and/or one or more other devices of the group 112.

Additionally or alternatively, in an embodiment, the information received by the device 104a includes any appropriate information pertinent to the device 104a and/or one or more other devices of the group 112. For example, the information received by the device 104a includes a list of users authorized to access the device 104a and/or one or more other devices of the group 112 (and may possibly include user identifications (IDs) and passwords of the authorized users). In another example, the information received by the device 104a includes a list of users banned from accessing the device 104a and/or one or more other devices of the group 112.

Additionally or alternatively, in an embodiment, the information received by the device 104a includes one or more attributes or rules regarding which device can access and/or use the information (e.g., attributes or rules that selectively allow or prohibit one or more devices from accessing and/or processing the information or a subset of the information). As an example, the information includes a rule that states that (i) a subset of the information can be used by only those devices in the group 112 that have a switching capacity of more than a threshold value, have a specific model number, a specific version of software installed, and/or the like, and (ii) another subset of the information can be used by all the devices in the group 112.

Additionally or alternatively, in an embodiment, the information received by the device 104a also includes time based attributes (e.g., time stamps). For example, a time stamp associated with configuration data included in the information indicates that the configuration data is valid for only a period of time. In another example, another time stamp associated with the configuration data included in the information indicates a creation time of the configuration data.

In an embodiment, once the device 104a receives the information, the device 104a processes the information. Subsequently, the device 104a propagates the information to other devices included in the group 112. For example, the device 104a transmits the information to the devices 104b and 104e (which are neighboring to the device 104a and are included in the group 112). The device 104b further transmits the information from the device 104a to the devices 104c and 104e (i.e., to the devices which are neighboring to the device 104b and which are included in the group 112). The device 104e transmits the information from the device 104a to the device 104g (i.e., to devices which are neighboring to the device 104b and which are included in the group 112). Thus, the information (or a subset of the information) is propagated recursively from the device 104a to the other devices of the group 112.

As illustrated in FIG. 1, the device 104a is coupled to the device 104g via the device 104d, where the device 104g is a member of the group 112 and the device 104d is not a member of the group 112. In an embodiment, the device 104a communicates with the device 104g and transmits the information to the device 104g via the device 104d in a manner such that the transmission is transparent to the device 104d. For example, the device 104a transmits the information to the device 104g via the device 104d, without the device 104d attempting to process the information and/or attempting to use the information to configure itself (e.g., as the device 104d is not a part of the group 112).

As discussed, the device 104a receives the information, processes the information, and transmits the processed information to one or more other devices of the group 112. In an embodiment, the device 104a transmits only a subset of the information to one or more other devices of the group 112. For example, a first subset of the information received by the device 104a is intended to be solely used by the device 104a, and a second subset of the information received by the device 104a is intended to be transmitted and used by the other devices of the group 112. In such an example, the device 104a receives the information, uses the first and second subset of information, and propagates only the second subset of information to the other devices of the group 112.

For example, the device 104a receives a list of users authorized to access one or more devices of the group 112. The list includes IDs of the authorized users and associated passwords. As previously discussed, in an embodiment, the information includes one or more attributes or rules regarding which device can access and use the information (e.g., attributes that selectively allow or prohibit one or more devices from accessing the information or a subset of the information). For example, an attribute or rule in the information may authorize the device 104a to retain and use the IDs and passwords of the authorized users, to transmit both the IDs and passwords of the authorized users to a first subset of devices of the group 112, and to transmit only the IDs of the authorized users to a second subset of devices of the group 112. Accordingly, the device 104a retains and uses the IDs and the passwords of the authorized users, propagates both the IDs and passwords of the authorized users to the first subset of devices of the group 112, and propagates only the IDs of the authorized users to the second subset of devices of the group 112.

In another example, the device 104a receives the information, selectively modifies a subset of the information and does not modify another subset of information, and propagates the modified subset of information and/or the another subset of information to one or more other devices of the group 112. For example, the information received by the device 104a includes one or more internet protocol (IP) addresses, e.g., an IP address of the device 104a (e.g., as a destination address) and/or an IP address of a device from which the information originated. The device 104a modifies the information (e.g., by appropriately modifying the IP addresses), before propagating the information to other devices of the group 112. For example, the device 104a modifies the information by including an IP address of the devices to which the information is to be propagated (or an IP address of the device 104a, as the originator of the information), before propagating the information.

In another example, the information is transmitted to all the devices in the group 112 (e.g., without any modification). However, based on an attribute or a rule included in the information, only a subset of the devices in the group 112 (e.g., only those devices that have a specific version of software installed) uses the information (e.g., to configure themselves).

Reception, processing and propagation of the information can also depend on a variety of other factors. For example, in an embodiment, a device of the group 112 communicates with other devices of the group 112, and propagates subsets of the information to the other devices based on such communication. For example, the device 104a communicates with the device 104c (e.g., via the device 104b) and selectively propagates a subset of the information to the device 104c based on the communication (e.g., based on a need of information by the device 104c).

As previously discussed, a device in the group 112 may receive information from a number of sources. For example, the device 104e receives a first subset of the information from the device 104a (e.g., via the communication link between the devices 104a and 104e), and receives a second subset of information from the device 104b (e.g., may also receive a third subset of information from the device 104g, and a fourth subset of information from the administrator 108). Thus, the information propagates through the network 100 in a distributed fashion, where each device in the group 112 receives subsets of the information from respective sources.

In an embodiment, a device of the group 112 advertises (or provides an indication) about the information that is available in the device for sharing with other devices of the group 112. Thus, in an embodiment, each device is aware of the information (or subsets of the information) that is available with various other devices of the group 112 (e.g., the device 104e may be aware that a first subset of information is available with the device 104a, while a second subset of information is available with the device 104b). In an embodiment, based on such awareness, a device receives subsets of the information from respective sources, e.g., from various other devices of the group 112 (e.g., the device 104e receives the first subset of information from the device 104a, and the second subset of information from the device 104b).

As a device may receive information from multiple sources, there may be conflict between information received from such multiple sources. As an example, the device 104e receives (i) first configuration information from the device 104a and (ii) second configuration information from the device 104b. Furthermore, there may be conflict between the first configuration information and the second configuration information. For example, the second configuration information may be an older version, while the first configuration information may be a relatively newer version of configuration information. In an embodiment, the device 104e resolves such a conflict in one of a variety of appropriate manners. For example, the device 104e (i) uses time stamps included in the first and second configuration information to select one of the first and second configuration information, (ii) uses the selected configuration information to configure itself, and (iii) propagates the selected configuration information to other devices in the group 112 (e.g., to the device 104g). Additionally or alternatively, the device 104e (i) uses a priority level included in the first and second configuration information to select one of the first and second configuration information, (ii) uses the selected configuration information to configure itself, and (iii) propagates the selected configuration information to other devices in the group 112 (e.g., to the device 104g). The device 104e may also use other suitable mechanism to resolve conflict between the first and second configuration information.

In an embodiment, the network 100 and the associated devices include security arrangements to allow authentication of the information that is exchanged between the devices of the group 112. For example, the information exchanged between the devices of the group 112 is encrypted, and individual devices in the group 112 comprises appropriate decryption units to decrypt the encrypted information (e.g., to prevent malicious users from introducing an unauthorized configuration source into the group 112).

In an embodiment, an administrator (e.g., administrator 108) keeps track of the group 112 and/or propagation of information among various devices of the group 112. For example, the administrator 108 can log in the device 104e, and view the configuration of the group 112 (e.g., existence and location of various devices of the group 112) in a user interface (UI) of the device 104e. In an example, the administrator 108 can also view, in the UI of the device 104e, information that the device 104e has received from other devices of the group 112, and/or information that the device 104e has transmitted to other devices of the group 112. In an embodiment, device 104e is also aware of the information that is propagated among the other devices of the group 112, and the administrator 108 can also view, in the UI of the device 104e, how and what information has been propagated among the other devices of the group 112.

Figure 2:
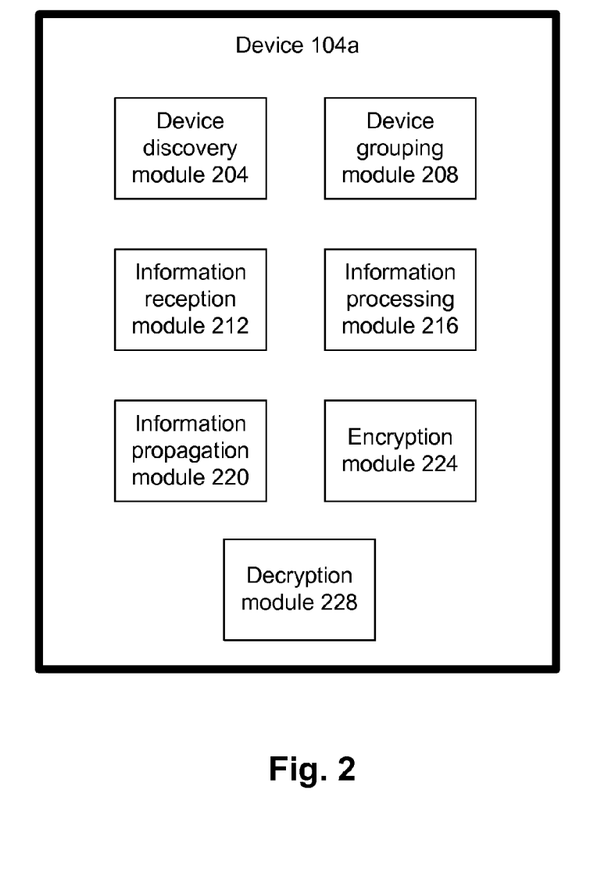
FIG. 2 schematically illustrates an example device of the plurality of network devices of the network of FIG. 1.

FIG. 2 schematically illustrates an example device (e.g., device 104a) of the network 100. In an embodiment, the device 104a comprises a device discovery module 204 configured to discover a plurality of devices (e.g., one or more of the devices 104b, . . . , 104h) of the network 100. In an embodiment, the device 104a also comprises a device grouping module 208 configured to establish a group of devices (e.g., group 112). In an embodiment, the device 104a also comprises an information reception module 212 configured to receive, from one or more appropriate sources (e.g., an administrator and/or one or more other device of the group 112), information that is pertinent to the devices included in the group 112.

In an embodiment, the device 104a also comprises an information processing module 216 configured to process the received information. For example, the information processing module 216 uses the received information to configure the device 104a. In another example, the information processing module 216 modifies the received information to generate processed information. In an embodiment, the device 104a also comprises an information propagation module 220 configured to propagate the processed information to one or more other devices of the group 112.

In an embodiment, the device 104a also comprises an encryption module 224 to encrypt the information, before transmitting the information to other devices of the group 112. In an embodiment, the device 104a also comprises a decryption module 228 to decrypt the information received by the information reception module 212. In an embodiment, the encryption module 224 and/or the decryption module 228 are integrated with the information processing module 216.

Although FIG. 2 illustrates only the device 104a, one or more other devices of the network 100 may include structured that are at least in part similar to that of the device 104a of FIG. 2.

Figure 3:
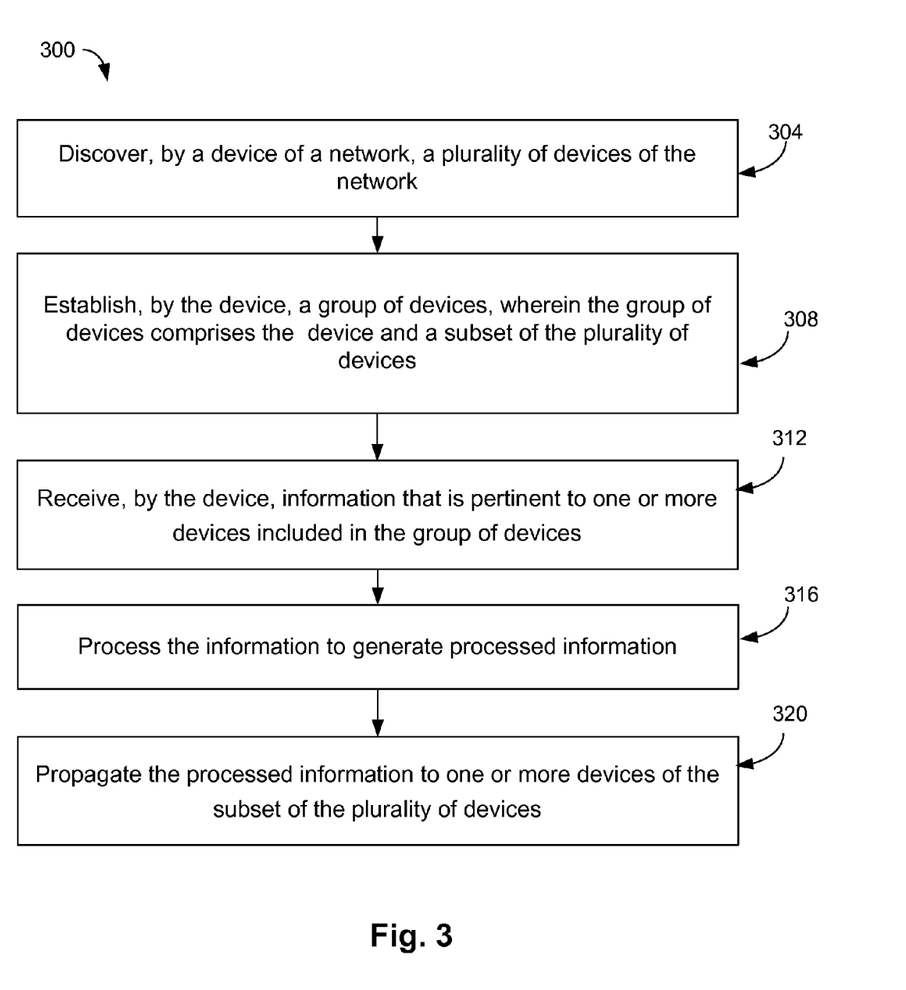
FIG. 3 illustrates an example method to operate a plurality of devices of a network.

FIG. 3 illustrates an example method to operate a plurality of devices (e.g., devices 104a, . . . , 104h) of a network (e.g., network 100). Referring to FIGS. 1-3, at 304, a device (e.g., device 104a) of the network discovers a plurality of devices (e.g., devices 104b, . . . , 104h) of the network. At 308, the device establishes a group of devices (e.g., group 112), where the group of devices comprises the device and a subset of the plurality of devices (e.g., comprises the device 104a and the devices 104b, 104c, 104e and 104g).

At 312, the device receives information that is pertinent to one or more devices included in the group of devices. For example, the information is received from one or more appropriate sources, e.g., an administrator of the network and/or one or more devices of the group.

At 316, the device processes the information to generate processed information. For example, the device uses the received information to configure itself. In another example, the device modifies the received information to generate the processed information. At 320, the device propagates the processed information to one or more devices (e.g., one or more of the devices 104b, 104c, 104e and 104g) included in the subset of the plurality of devices (i.e., to one or more of the other devices of the group 112).

Propagating the information among the devices of the group 112, as discussed herein, has several advantages. For example, the devices of the group 112 of the network 100 can be configured and/or updated in a distributed manner, as discussed herein. This creates an efficient, fault-tolerant way to configure and/or update a large number of devices in the network 100. A number of configuration sources (e.g., a source that can provide configuration information to various devices in the group 112) grows in conjunction with the number of devices in the group 112 (e.g., as each device in the group 112 can potentially act a configuration source). Thus, the distributed manner of configuring and updating network devices, as discussed herein, can be easily adapted for a network that includes a very large number of network devices.

In accordance with an embodiment, an article of manufacture may be provided that includes a storage medium having instructions stored thereon that, if executed, result in the operations described herein with respect to the method 300 of FIG. 3 (and/or various other operations discussed in the present disclosure). In an embodiment, the instructions, if executed, result in the operations performed by one or more of the devices (e.g., device 104a of FIG. 2) of the network 100 of FIG. 1. In an embodiment, the storage medium comprises some type of non-transitory memory (not shown). In accordance with various embodiments, the article of manufacture may be a computer-readable medium such as, for example, software or firmware.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the terms "embodiment" or "embodiments," which may each refer to one or more of the same or different embodiments. Furthermore, the terms "comprising," "including," "having," and the like, as used with respect to embodiments, are synonymous.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method comprising:
  discovering, by a network device of a network, a plurality of network devices of the network;
  based on discovery of the plurality of network devices, establishing, by the network device, a group of network devices, wherein the group of network devices comprises the network device and a subset of the plurality of network devices;
  receiving, by the network device, information that is pertinent to one or more network devices included in the group of network devices, wherein the information comprises (i) configuration information to configure the one or more network devices included in the group of network devices, (ii) updates to update software or firmware installed in the one or more network devices included in the group of network devices, (iii) programming scripts for execution by the one or more network devices included in the group of network devices, and (iv) attributes that identify individual network devices in the group of network devices, which are to receive a respective subset of the information;
  processing the information to generate processed information; and
  propagating the processed information to one or more network devices of the subset of the plurality of network devices, wherein the processed information propagated to the one or more network devices of the subset of the plurality of network devices is useable by the one or more network devices of the subset of the plurality of network devices to (i) configure one of the one or more network devices of the subset of the plurality of network devices, (ii) update the software or firmware installed in one of the one or more network devices of the subset of the plurality of network devices, (iii) execute programming scripts by one of the one or more network devices of the subset of the plurality of network devices, and (iv) identify individual network devices in the group of network devices, which are to receive a respective subset of the information.

2. The method of claim 1, wherein establishing the group of network devices further comprises:
establishing the group of network devices based on the network device and the subset of the plurality of network devices having one or more common attributes.

3. The method of claim 2, wherein the one or more common attributes comprise one or more of a type of network device, a device class of network device, a make of network device, a model of network device, and a version number of network device.

4. The method of claim 1, wherein processing the information further comprises:
modifying the information to generate the processed information.

5. The method of claim 1, wherein the information comprises a first subset of information and a second subset of information, wherein processing the information further comprises:
processing the information such that (i) the first subset of information is included in the processed information, and (ii) the second subset of information is excluded from the processed information.

6. The method of claim 1, wherein processing the information further comprises:
processing the information to generate the processed information, such that the information and the processed information are the same.

7. The method of claim 1, wherein the network device is a first network device, and propagating the processed information further comprises:
transmitting, by the first network device, the processed information to a second network device of the one or more network devices of the subset of the plurality of network devices in order to facilitate the second network device to propagate the processed information to another one or more network devices of the subset of the plurality of network devices, wherein the second network device is coupled to the first network device via a communication link.

8. The method of claim 1, wherein receiving, by the first network device, the information further comprises:
receiving the information from one or both of (i) an administrator of the network, and (ii) another one or more network devices of the subset of the plurality of network devices.

9. The method of claim 1, wherein the information is encrypted, and wherein processing the information further comprises:
decrypting the information.

10. A network device included in a network, the network device comprising:
a device discovery module configured to discover a plurality of network devices of the network;
a device grouping module configured to establish a group of network devices comprising the network device and a subset of the plurality of network devices;
an information reception module configured to receive information that is pertinent to one or more network devices included in the group of network devices, wherein the information comprises (i) configuration information to configure the one or more network devices included in the group of network devices, (ii) updates to update software or firmware installed in the one or more network devices included in the group of network devices, (iii) programming scripts for execution by the one or more network devices included in the group of network devices, and (iv) attributes that identify individual network devices in the group of network devices, which are to receive a respective subset of the information;
an information processing module configured to process the information to generate processed information; and
an information propagation module configured to propagate the processed information to one or more network devices of the subset of the plurality of network devices, wherein the processed information propagated to the one or more network devices of the subset of the plurality of network devices is useable by the one or more network devices of the subset of the plurality of network devices to (i) configure one of the one or more network devices of the subset of the plurality of network devices, (ii) update the software or firmware installed in one of the one or more network devices of the subset of the plurality of network devices, (iii) execute programming scripts by one of the one or more network devices of the subset of the plurality of network devices, and (iv) identify individual network devices in the group of network devices, which are to receive a respective subset of the information.

11. The network device of claim 10, wherein the device grouping module is configured to establish the group of network devices based on the network device and the subset of the plurality of network devices having one or more common attributes.

12. The network device of claim 11, wherein the one or more common attributes comprise one or more of a type of network device, a device class of network device, a make of network device, a model of network device, and a version number of network device.

13. The network device of claim 10, wherein the information processing module is configured to process the information by modifying the information to generate the processed information.

14. The network device of claim 10, wherein the information comprises a first subset of information and a second subset of information, wherein the information processing module is configured to process the information such that (i) the first subset of information is included in the processed information, and (ii) the second subset of information is excluded from the processed information.

15. The network device of claim 10, wherein the information processing module is configured to process the information such that the information and the processed information are the same.

16. The network device of claim 10, wherein:
the network device is a first network device, and the information propagation module is configured to propagate the processed information by transmitting the processed information to a second network device of the one or more network devices of the subset of the plurality of network devices in order to facilitate the second network device to propagate the processed information to another one or more network devices of the subset of the plurality of network devices; and the second network device is coupled to the first network device via a communication link.

17. The network device of claim 10, wherein the information reception module is configured to receive the information from one or both of (i) an administrator of the network, and (ii) another one or more network devices of the subset of the plurality of network devices.

18. The network device of claim 10, further comprising:
a decryption module configured to decrypt the information received by the information reception module; and
an encryption module configured to encrypt the processed information, prior to propagating the processed information.

* * * * *